United States Patent
Patti

Patent Number: 5,120,174
Date of Patent: Jun. 9, 1992

[54] TORQUE LOSS INDICATOR

[75] Inventor: Anthony J. Patti, Hayward, Calif.

[73] Assignee: Wheel Masters Inc., San Leandro, Calif.

[21] Appl. No.: 670,893

[22] Filed: Mar. 18, 1991

[51] Int. Cl.$^5$ ............... F16B 37/14; F16B 31/02; F16B 41/00

[52] U.S. Cl. ................... 411/431; 411/14; 411/377; 411/910; 116/28 R; 116/307; 116/309

[58] Field of Search ............... 116/200, 306, 307, 309, 116/28 R; 411/13, 14, 429, 430, 431, 371, 372, 373, 374, 375, 376, 377, 910

[56] References Cited

U.S. PATENT DOCUMENTS

| | | | |
|---|---|---|---|
| 3,585,900 | 6/1971 | Chaivre | 411/430 |
| 4,018,133 | 4/1977 | Chaivre et al. | 411/429 |
| 4,203,382 | 5/1980 | Mullen | 116/28 R |
| 4,400,123 | 8/1983 | Dunegan | 411/431 |
| 4,521,146 | 6/1985 | Wharton | 411/429 |
| 4,659,273 | 4/1987 | Dudley | 411/429 |
| 4,709,654 | 12/1987 | Smith | 116/283 |
| 4,784,555 | 11/1988 | Cantrell | 411/431 |
| 4,944,644 | 7/1990 | Bell | 411/431 |
| 4,948,319 | 8/1990 | Day et al. | 411/377 |
| 4,968,202 | 11/1990 | Lanham | 411/377 |

FOREIGN PATENT DOCUMENTS

| | | | |
|---|---|---|---|
| 0153487 | 9/1985 | European Pat. Off. | 411/429 |
| 0804736 | 4/1951 | Fed. Rep. of Germany | 411/373 |
| 2386722 | 11/1978 | France | 411/377 |
| 2415742 | 8/1979 | France | 411/429 |
| 0496384 | 12/1975 | U.S.S.R. | 411/13 |
| 0678839 | 9/1952 | United Kingdom | 411/377 |

*Primary Examiner*—William A. Cuchlinski, Jr.
*Assistant Examiner*—John L. Beres
*Attorney, Agent, or Firm*—Linval B. Castle

[57] ABSTRACT

A warning device for indicating undesired rotation of a threaded nut on a non-rotatable threaded shaft includes a tight fitting shell for covering the nut and a manually rotatable highly visible indicator on the end of the shell to be adjusted to a predetermined initial alignment. Any torque change caused by nut rotation will therefore rotate the indicator from its predetermined alignment.

7 Claims, 1 Drawing Sheet

TORQUE LOSS INDICATOR

BRIEF SUMMARY OF THE INVENTION

This invention relates to the detection of undesired rotation of a nut on a threaded member and in particular to the accidental loosening of a nut on a non-rotatable bolt or threaded stud such as a truck wheel lug bolt.

Many mechanical structures employ large hex nuts secured to threaded stationary studs in which only the surface of the nut itself is exposed. Visual inspection of such a nut will normally not reveal whether the nut has been unscrewed a quarter turn or less and therefore released a substantial amount of torque from the stud. Such a torque loss is therefore discoverable only by tightening the nut with a torque wrench.

Torque loss of wheel lug nuts can prove very dangerous, particularly on heavy truck wheels which may vibrate off and become the cause of an accident if not periodically checked. The invention to be described provides a very simple and accurate visual check of any small amount of torque change caused by rotation of one or several wheel lug nuts.

Briefly described, the invention comprises tight fitting shells, one of which frictionally engages each nut on the wheel. The end of each shell contains indicia, such as a conspicuous arrow, which is independently rotatable around the axis of the shell. After the nut has been tightened to the proper torque, the shell is applied and its indicium rotated to a predetermined alignment. For example, if a nut is a part of a stationary structure, all indicia may be adjusted into vertical of horizontal alignment; if a wheel lug nut, all indicia may be adjusted radially to point at the wheel hub or circumferentially around the hub. Any subsequent misalignment of the indicia from the predetermined alignment will therefore indicate a rotation of the nut and change in torque.

DESCRIPTION OF THE DRAWINGS

In the drawings which illustrate the preferred embodiment of the invention.

DESCRIPTION OF THE PREFERRED EMBODIMENT

Figure 2:
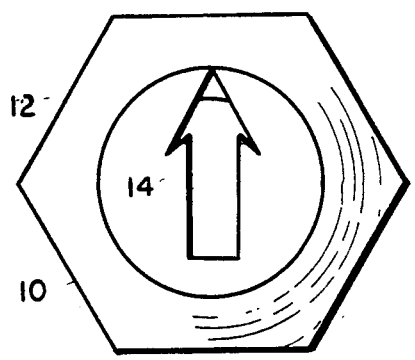
FIG. 2 is a top plan view of the torque loss indicator illustrating a rotatable arrow indicium.
Figure 1:
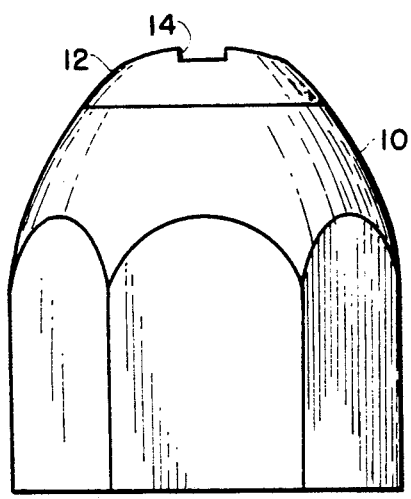
FIG. 1 is a side elevational view of my torque loss indicator.

FIG. 1 is an elevational view illustrating a domelike hollow shell 10 formed to snugly fit over a threaded nut, such as a vehicle wheel lug nut. Mounted on top of the shell 10 is a disclike member 12 having an indicium 14, preferably in the form of an arrow, in the top surface as best shown in the plan view of FIG. 2. As will be described in detail, the member 12 with indicium 14 may be rotated with respect to the shell 10 to indicate a change of torque of the nut upon which the shell is secured.

Figure 5:
FIG. 5 is a side elevational view of a non-rotatable insert that is secured in the top surface of the hollow shell of FIG. 3.
Figure 3:
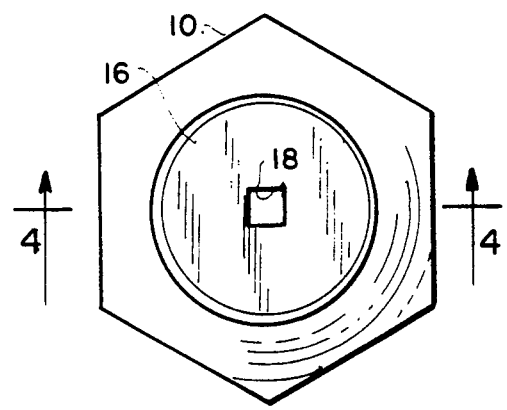
FIG. 3 is a top plan view of the hollow shell of only the indicator.
Figure 4:
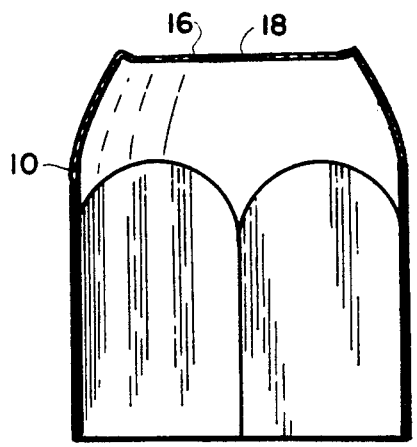
FIG. 4 is a sectional elevational view taken along the lines 4—4 of FIG. 3.

FIG. 3 is another plan view of the hollow shell 10, but with the disclike member 12 removed therefrom, and FIG. 4 is a sectional view of the shell taken along the lines 4—4 of FIG. 3. The top 16 of the shell 10 is substantially planar with an anchor hole 18 in the center for receiving a key 20 protruding from the bottom surface of a non-rotatable insert member 22, as shown in FIG. 5. The insert member 22 is preferably formed of a brightly colored plastic so that it is readily visible through the indicium 14. The protruding key 20 is preferably square in cross section and the anchor hole 18 may be square so that the key may be cemented into the anchor hole, or the hole may be star shaped or of some shape that will securely lock the insert member 22 against removal and rotation once the key 20 is inserted therein.

Figure 6:
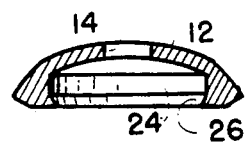
FIG. 6 is a side elevational view of a rotatable member which engages the insert of FIG. 5.

The insert member 22 is preferably a colored plastic member secured against rotation and removal from the top surface 16 of the shell 10. The plastic material of the insert member is very firm but a slight resilience permits it to be forced into a cavity 24 in the bottom surface of the disclike member 12, shown in detail in the sectional view of FIG. 6. From a maximum inside diameter corresponding to the maximum outside diameter of the insert member 22, the cavity preferably has an inward bevel 26 formed toward its opening to correspond to a bevel in the insert member thereby securing the insert member 22 within the cavity 24 once the two members have been interconnected. The indicium 14 in the disclike member 12 is cut completely through the top surface of the member 12 so that the colored plastic of the insert member 22 is visible therethrough. Also, the disclike member 12 is rotatable by hand, or by inserting a coin into the indicium 14, whereas the insert member 22 remains non-rotatable in the top of the shell 10.

Assembly of the indicator involves, first, the insertion of the colored plastic insert member 22 into the cavity 24 of the disclike member 12. The key 20 protruding from the bottom of the insert member 22 is then inserted and cemented, if necessary, into the hole 18 centered in the planar top surface 16 of the shell 10.

Figure 7:
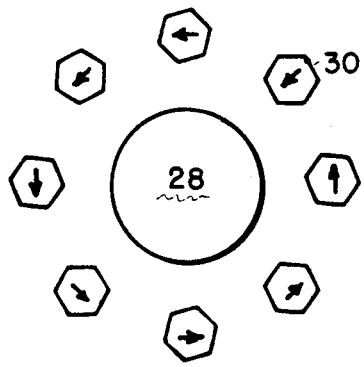
FIG. 7 is a schematic view illustrating one form of indicium alignment of torque loss indicators on truck wheel lug nuts.

In use as an indicator of torque changes of truck wheel lug nuts, the lug nuts are first tightened to an optimum torque using a torque wrench or other acceptable means, and a shell 10 is then forced onto each nut. The indicia 14 on all shells are then aligned into some desired prearranged order such as, for example, all radially aligned and pointing to the wheel hub center, or in a circumferential alignment of indicia around a hub 28 as shown in FIG. 7. If through vibration or other causes, only one lug nut 30 becomes loosened, the indicium on the shell on that nut will readily indicate such problem by a mere visual inspection so that appropriate corrective measures may be taken.

I claim:

1. A warning device for indicating undesired rotation of a threaded nut on a threaded shaft, said warning device comprising:

a hollow shell configured for frictional attachment over the threaded nut, said shell having an end surface and a longitudinal axis substantially coaxial with the hole in said nut;

an indicating member rotatably coupled to said end surface of said hollow shell and rotatable around said longitudinal axis; and apertured visual ndicium on said indicating member.

2. The threaded nut rotation warning device claimed in claim 1 wherein said threaded shaft is non-rotatable and said indicating member is initially rotated to position wherein said visual indicium is in a predetermined alignment.

3. A threaded nut rotation warning device for indicating rotation of a threaded nut on a non-rotatable threaded shaft, said warning device comprising:
- a hollow shell configured for frictional attachment over the threaded nut, said shell having a top surface and a longitudinal axis substantially coaxial with said threaded shaft;
- a circular insert member securely attached to and overlying the top surface of said hollow shell, said insert member lying in a plane substantially perpendicular to the longitudinal axis of said hollow shell;
- an indicating member having a top surface with an indicium bar cut therethrough, said indicating member being frictionally and rotatably coupled to said circular insert member.

4. The warning device claimed in claim 3 wherein said circular insert member has a bottom surface to conform to the top surface of said hollow shell, and a depending key extending from said bottom surface to engage a mating hole in the top surface of said hollow shell.

5. The warning device claimed in claim 4 wherein said circular insert member is plastic.

6. The warning device claimed in claim 5 wherein said circular member is a colored plastic visible through said indicium bar.

7. The warning device claimed in claim 6 wherein said indicium bar is arrow shaped for indicating a predetermined initial alignment of said threaded nut and a change of rotation when said arrow varies from said initial alignment.

* * * * *